United States Patent [19]
Sasaki et al.

[11] Patent Number: 5,257,344
[45] Date of Patent: Oct. 26, 1993

[54] CHARACTER OUTLINE PROCESSOR USING RELATIVELY SMALL MEMORY STORING COORDINATE DATA GROUPS FOR DIFFERENT OUTLINES OF SAME CHARACTER, AND COMMON ATTRIBUTE FLAG DATA

[75] Inventors: Ichiro Sasaki, Aichi; Kazuma Aoki, Kasugai, both of Japan

[73] Assignee: Brother Kogyo Kabushiki Kaisha, Nagoya, Japan

[21] Appl. No.: 875,403

[22] Filed: Apr. 29, 1992

[30] Foreign Application Priority Data

May 8, 1991 [JP] Japan .................................. 3-132000

[51] Int. Cl.$^5$ ........................................... G06K 15/00
[52] U.S. Cl. .................................... 395/110; 395/109
[58] Field of Search ............... 395/109, 110, 115, 150, 395/151, 164–166; 382/21, 56, 22; 358/470; 340/735, 750, 747, 748; 346/154, 157

[56] References Cited

U.S. PATENT DOCUMENTS

| | | | |
|---|---|---|---|
| 4,542,412 | 9/1985 | Fuse et al. | 358/56 |
| 5,018,217 | 5/1991 | Yoshida et al. | 395/110 |
| 5,073,956 | 12/1991 | Kawamoto et al. | 395/110 |
| 5,138,696 | 8/1992 | Nagata | 395/110 |

FOREIGN PATENT DOCUMENTS

63-6874  2/1988  Japan .................................. 395/110

Primary Examiner—Arthur G. Evans
Attorney, Agent, or Firm—Oliff & Berridge

[57] ABSTRACT

A data processing apparatus for processing a batch of outline data representative of outlines of characters each consisting of at least one stroke, each outline consisting of two or more straight and/or curved segments, the apparatus including an outline data memory storing the outline data. Each segment of the character outline is represented by coordinate data sets representative of coordinate values defining the segment, and attribute flag data indicative of whether the segment is a straight line or a curved line. The outline data memory includes a first storage area storing a plurality of groups of coordinate data sets for respective different outlines (such as regular and boldface outlines) of each character which define respective different stroke widths of the character, and a second storage area storing a common groups of attribute flags which is commonly used for the plurality of groups of coordinate data sets.

12 Claims, 10 Drawing Sheets

REGULAR OUTLINE

BOLDFACE OUTLINE

OUTLINE DATA FOR CHARACTER "D"

REGULAR OUTLINE COORDINATE DATA — 32
| xr0,yr0 | xr1,yr1 | xr2,yr2 | xr3,yr3 | xr4,yr4 | xr0,yr0 | xr4,yr4 | xr5,yr5 | xr6,yr6 | xr7,yr7 | xr4,yr4 |

BOLDFACE OUTLINE COORDINATE DATA — 33
| xb0,yb0 | xb1,yb1 | xb2,yb2 | xb3,yb3 | xb4,yb4 | xb0,yb0 | xb4,yb4 | xb5,yb5 | xb6,yb6 | xb7,yb7 | xb4,yb4 |

FIG. 4A

COMMON ATTRIBUTE FLAGS — 31
| S | B | L | * | S | L | B | * | ! |

FIG. 4B

OUTLINE DATA FOR CHARACTER "D"

REGULAR OUTLINE DATA

| S | xr0,yr0 | B | xr1,yr1 | xr2,yr2 | xr3,yr3 | L | xr0,yr0 | * |
|---|---------|---|---------|---------|---------|---|---------|---|
| S | xr4,yr4 | L | xr5,yr5 | B | xr6,yr6 | xr7,yr7 | xr4,yr4 | * | ! |

BOLDFACE OUTLINE DATA

| S | xb0,yb0 | B | xb1,yb1 | xb2,yb2 | xb3,yb3 | L | xb0,yb0 | * |
|---|---------|---|---------|---------|---------|---|---------|---|
| S | xb4,yb4 | L | xb5,yb5 | B | xb6,yb6 | xb7,yb7 | xb4,yb4 | * | ! |

FIG. 10
PRIOR ART

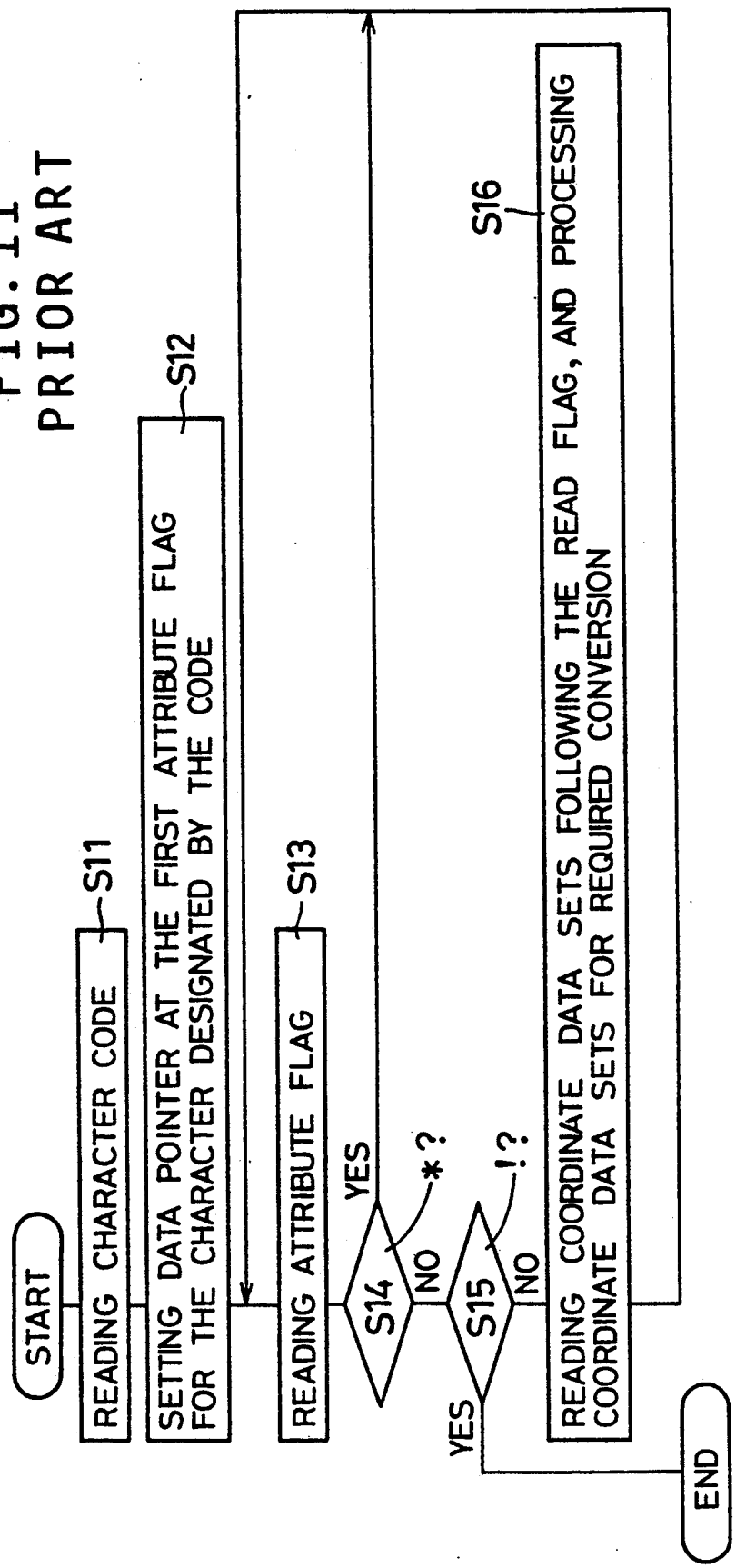

CHARACTER OUTLINE PROCESSOR USING RELATIVELY SMALL MEMORY STORING COORDINATE DATA GROUPS FOR DIFFERENT OUTLINES OF SAME CHARACTER, AND COMMON ATTRIBUTE FLAG DATA

BACKGROUND OF THE INVENTION

1. Field of the Invention

The present invention relates generally to a data processing apparatus which forms a part of a controller of an output device such as a laser printer, for processing outline data representative of character outlines, and more particularly to such a data processing apparatus which is capable of processing or providing two or more groups of outline data representative of respective different outlines having different stroke widths for each character.

2. Discussion of the Prior Art

A character such as a letter or symbol to be displayed or printed is represented by a group of outline data representative of the outline of the character. The character consists of at least one stroke, and the outline of the character consists of a plurality of segments such as straight lines and curved lines, which are connected to each other so as to form a closed loop or loops. Each group of outline data includes coordinate data sets representative of coordinate values of the points which define each segment of the outline, and attribute flags each indicative of the type of teach segment of the outline, e.g., straight or curved line. The same character may have different outlines, for example, a regular outline having a regular stroke width, and a boldface outline whose stroke width is larger than the regular stroke width. In this case, two outline data groups each consisting of the coordinate data sets and the attribute flags are required for the two different outlines. FIG. 10 shows a group of outline data sets for the regular outline of the character "D", and another group of outline data sets for boldface outline of the same character. In each group of outline data sets, each attribute flag (S, B, L) indicative of a straight or curved line is followed by one or more pairs of x-axis and y-axis coordinate values. As indicated in FIGS. 3A and 3B, the outline of the character "D" consists of an outer closed loop and an inner closed loop, which define the stroke width of the character to be displayed, printed or otherwise outputted. For each of the regular and boldface outlines, the inner loop is represented by the upper row of data while the outer loop is represented by the lower row of data, as seen in FIG. 10.

Thus, coordinate data sets representative of straight and/or curved segments of each closed loop and attribute flags indicative of the type of each segment are required for each of different outlines of each character which have different stroke widths. Usually, a batch of outline data for a large number of characters is stored in a read-only memory.

When a character is printed, for instance, the corresponding outline data is first processed as indicated in the flow chart of FIG. 11, by way of example. Initially, a character code representative of the character to be printed is read in step S11. Step s11 is followed by step S12 in which a data pointer is set at the first outline data set, namely, the first attribute flag (start point flag) for the character designated by the character code. Then, step S13 is executed to read the first attribute flag, store it in a random-access memory, and then advance the data pointer one step.

The control flow then goes to step S14 to determine whether or not the attribute flag currently stored in the random-access memory is a loop end flag "*" indicative of the end of a closed loop of the character outline, namely, the end of the outline data for that closed loop. If the attribute flag is the loop end flag "*", the control flow returns to step S13 to read the first attribute flag for the next closed loop of the character outline. If the attribute flag is not the loop end flag "*", step S14 is followed by step S15 to determine whether or not the current attribute flag is an outline end flag "!" indicative of the end of the character outline, namely, the end of the outline data for the character. If an affirmative decision (YES) is obtained in step S15, the routine of FIG. 8 is terminated. If a negative decision (NO) is obtained in step S15, that is, if the attribute flag read in step S13 is neither the loop end flag "*" nor the outline end flag "!", then the control flow goes to step S16. In step S16, coordinate data following the current attribute flag is read and processed for required converting operations, which include, for example, the conversion of the coordinate data of curved lines into short-vector data, and the conversion of the coordinate data depending upon the selected size and attitude of the character. Then, the data pointer is advanced to read the next attribute flag in step S13 which follows step S16. The data obtained in step S16 is stored in the random-access memory. Steps S13–S16 are repeatedly executed until the affirmative decision (YES) is obtained in step S15, namely, until the outline end flag "!" is read in step S13. The data obtained in step S16 and stored in the random-access memory is subsequently converted into dot data representative of image dots which collectively define the outline of the character. The dot data is supplied to a printing device so that the relevant character is printed according to the dot data.

In the known data processing apparatus, however, the attribute flags are required for each of two or more groups of coordinate data sets for respective different outlines of the same character. Further, a group of coordinate data sets is required for each of different outlines which define respective different stroke widths for each character. Accordingly, the outline data memory in the form of a read-only memory should have a considerably large data storage capacity. The required storage capacity is particularly large, when the characters available include Chinese characters, whose outlines generally consist of many segments including those for serifs at the ends of strokes of the characters. The number of coordinate values representative of the outline segments and the number of the corresponding attribute flags increase with the number of the outline segments.

SUMMARY OF THE INVENTION

It is therefore an object of the present invention to provide a data processing apparatus which is capable of processing or providing two or more groups of outline data sets representative of respective different outlines having different stroke widths for each character, and which apparatus uses an outline data memory having a relatively small data storage capacity.

The above object may be achieved according to a first aspect of the present invention, which provides a data processing apparatus for processing a batch of outline data representative of outlines of a plurality of characters each consisting of at least one stroke, each of the outlines consisting of a plurality of segments which consist of at least one straight line and/or at least one curved line, the apparatus including outline data memory means for storing the batch of outline data, each of the segments being represented by coordinate data sets representative of coordinate values which define each segment, and attribute flags indicative of whether each segment is a straight line or a curved line, wherein the outline data memory means includes a first storage area storing a plurality of groups of coordinate data sets for respective different outlines of each character which define respective different stroke widths of each character, and a second storage area storing a common group of attribute flags common to the plurality of groups of coordinate data sets.

In the data processing apparatus of the present invention constructed as described above, the groups of coordinate data sets for respective different outlines of each character having different stroke widths are stored in the first storage area of the outline data memory means. For each character, a common group of attribute flags is stored in the second data storage area of the outline data memory means. The attribute flags are used commonly for two or more groups of coordinate data sets for different character outlines, when these groups of coordinate data sets are read out from the first data storage area, for necessary processing, for example, for conversion into the corresponding groups of dot data used for printing or displaying upon entering of a code representative of a specific character, together with stroke width data representative of the stroke width of that character.

For instance, the common group of attribute flags is commonly used such that an attribute flag pointer for specifying an address in the second data storage area and a coordinate pointer for specifying an address in the first data storage area are suitably controlled in timed relation with each other, depending upon the character designated by the received character code and the stroke width designated by the received stroke width data.

It will be understood that the required storage capacity of the outline data memory means can be made smaller that that of the known counterpart apparatus, since only one group of attribute flags is used for two or more groups of coordinate data sets for respective different outlines of the same character.

The above object may also be achieved according to a second aspect of this invention, which provides a data processing apparatus for processing a batch of outline data representative of outlines of a plurality of characters each consisting of at least one stroke, each of the outlines consisting of a plurality of segments which consist of at least one straight line and/or at least one curved line, each of the segments being represented by coordinate date sets representative of coordinate values which define each the segment, and attribute flags indicative of whether each the segment is a straight line or a curved line, the apparatus comprising: (a) outline data memory means storing the batch of outline data, the outline data memory means including a first storage area storing a plurality of groups of standard coordinate data sets for respective standard outlines of each character which define respective different standard stroke widths, and a second storage area storing a common group of attribute flags common to the plurality of groups of coordinate data sets; (b) special stroke width designating means for designating a desired stroke width of each character; and (c) coordinate data preparing means for obtaining, from the plurality of groups of standard coordinate data sets, a group of special coordinate data sets representative of an outline of each character having the desired stroke width designated by the special stroke width designating means, the outline data memory means further including a third data storage area for storing the group of special coordinate data sets, in relation to the common group of attribute flags stored in the second data storage area.

This data processing apparatus according to the second aspect of the invention has the same advantage as described above with respect the apparatus according to the first aspect of the invention, since the attribute flags are used commonly for two or more groups of coordinate data sets for respective different standard outlines of each character.

Further, the instant data processing apparatus having the coordinate data preparing means is capable of preparing a group of coordinate data sets for a character outline having the desired stroke width other than the standard stroke widths of the standard outlines. Accordingly, the coordinate data sets for a character outline having any desired special stroke width can be prepared from the coordinate data sets for the standard outlines and attribute flags for the same character. The coordinate data memory means does not have to store coordinate data sets for character outlines having such special stroke widths.

BRIEF DESCRIPTION OF THE DRAWINGS

The above and other objects, features and advantages of the present invention will be better understood by reading the following detailed description of a presently preferred embodiment of the invention, when considered in connection with the accompanying drawings, in which:

FIG. 4A is a view indicating two groups of coordinate data sets for the regular and boldface outlines of character "D" of FIGS. 3A and 3B, respectively, which are stored in the CHARACTER ROM of FIG. 2;

FIG. 4B is a view indicating a group of attribute flags common to the two coordinate data groups of FIG. 4A;

FIG. 10 is an illustration indicating two groups of outline data for the regular and boldface outlines of character "D" of FIGS. 3A and 3B, used in a known data processing apparatus; and FIG. 11 is a flow chart showing a data converting operation in the known data processing apparatus of FIG. 10.

DETAILED DESCRIPTION OF THE PREFERRED EMBODIMENT

Figure 1:
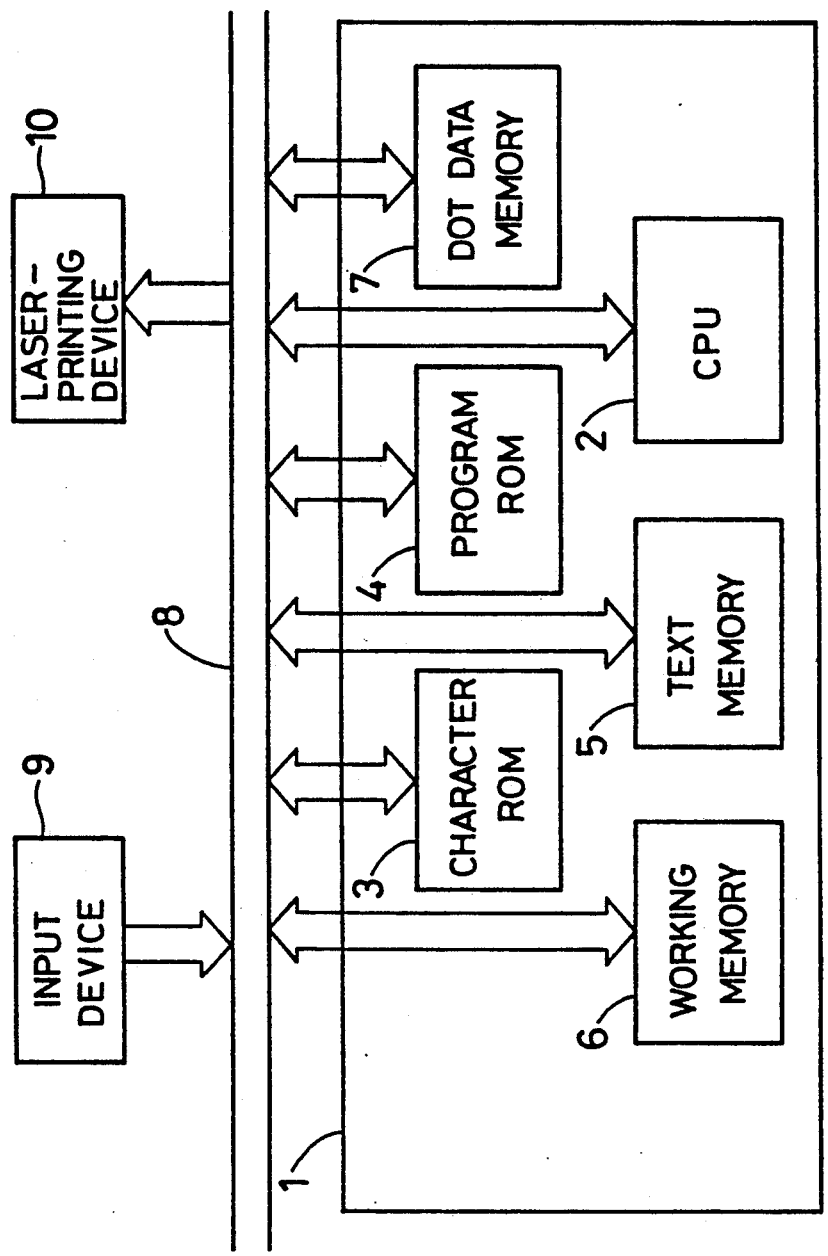
FIG. 1 is a schematic block diagram illustrating a control device for a laser printer, which incorporates a data processing apparatus constructed according to one embodiment of this invention.

Referring first to FIG. 1, there will be described the control device for a laser printer incorporating one embodiment of a data processing apparatus of the present invention. The laser printer is connected to an input device 9 and has a laser-printing device 10 which is controlled by the control device whose major portion is constituted by a microcomputer 1. The input device 9 and the laser-printing 10 are connected to the microcomputer 1 via a bus 8.

The microcomputer 1 includes a central processing unit (CPU) 2, a first read-only memory in the form of a CHARACTER ROM 3, a second read-only memory in the form of a PROGRAM ROM 4, a TEXT memory 5, a random-access memory in the form of a WORKING memory 6, and a DOT DATA memory 7. These elements 2-7 are interconnected with each other through the bus 8.

The input device 9, which may be a keyboard, functions to provide the microcomputer 1 with printing data necessary to operate the laser-printing device 10. The printing data includes: character codes representative of characters to be printed; stroke width data representative of the width of strokes of the characters; and character attitude data indicative of the attitude (e.g., standard upright attitude, and inclined or italic attitude) in which the characters are printed.

The laser-printing device 10 is operated according to dot data supplied from the DOT DATA memory 7. For example, the dot data represents image dots which lie within the outline of each character so as to collectively define the character.

The PROGRAM ROM 4 stores various control programs such as those for data processing operations according to the present embodiment, which will be described.

The TEXT memory 5 is used to store printing data such as the character codes, stroke width data, and character attitude data, necessary to perform a printing operation by the laser-printing device 10.

The WORKING memory 6 is provided to temporarily store data necessary for the CPU 2 to implement logic and arithmetic operations.

The DOT DATA memory 7 functions to store dot data prepared by dot data preparing means 46 of the microcomputer 1, which will be described.

The CHARACTER ROM 3 stores a batch of outline data for regular outlines and boldface outlines of the characters available for printing. Each character outline consists of at least one closed loop, and each closed loop consists of a plurality of segments connected to each other. The outline data for each of the regular and boldface outlines of each character consists of a group of coordinate data sets and a group of attribute flags. As described below, the coordinate data and the attribute flags are stored in different areas of the ROM 3. Each group of coordinate data sets represent pairs of x-axis and y-axis coordinate values of the points which define a character outline. These points include a start point of a closed loop, an end point of a straight segment (straight line) or a curved segment (curved line in the form of a Bezier curve), and first and second control points for the Bezier curve.

As indicated in TABLE 1 below, the attribute flags available consist of: straight segment flag "L" indicative of a straight line; curved segment flag "B" indicative of a Bezier curve; start point flag "S" indicative of the start point of a closed loop; loop end flag "*" indicative of the end of the closed loop; and outline end flag "!" indicative of the end of a character outline.

TABLE 1

| Flag | ordinate Data | Definition |
|---|---|---|
| S | Start point (x, y) | Start point of a closed loop |
| L | End point (x, y) | Straight line between the preceding point (as the start point and the specified end point (x, y) |
| B | First control point (x1, y1) Second control point (x2, y2) End point (x3, y3) | Bezier curve between the preceding point (as the start point) and the specified end point (x3, y3), the curvature being determined by the two control points (x1, y1) and (x2, y2) |
| * | Non | End of a closed loop |
| ! | Non | End of a character outline |

Each of the attribute flags "S", "L" and "B" corresponds to at least one pair of x-axis and y-axis coordinate values. The start point of a straight line or a Bezier curve is represented by a pair of coordinate values which define the preceding point, which is the end point of the preceding straight line or Bezier curve, or the start point of a closed loop of the character outline. The coordinate points of the loop segments are programmed and stored in the order of connection of the segments as seen in the counterclockwise direction for the outer loop of the character outline, and in the clockwise direction for the inner loop of the outline.

Figure 2:
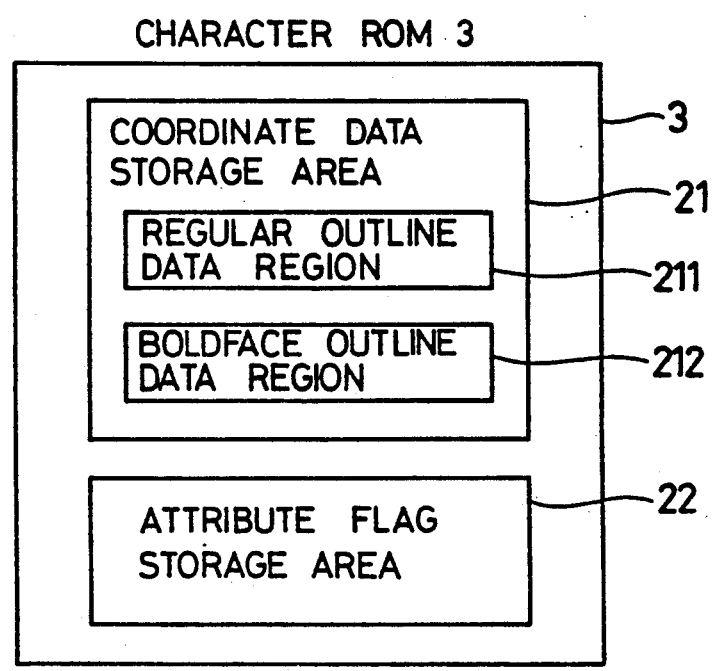
FIG. 2 is a view showing a CHARACTER ROM storing a batch of outline data representative of outlines of characters.
Figure 3A:
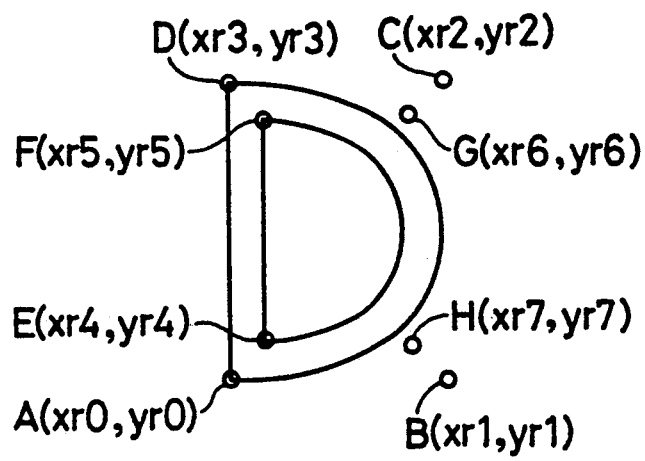
FIGS. 3A and 3B are views depicting regular and boldface outlines of character "D"
Figure 3B:
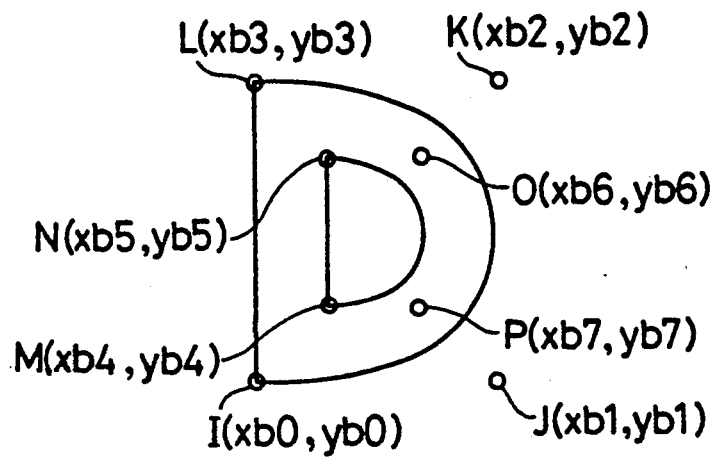

As indicated in FIG. 2, the CHARACTER ROM 3 storing the outline data for the regular and boldface outlines of each character includes a first data storage area in the form of a coordinate data storage area 21, and a second data storage area in the form of an attribute flag storage area 22. The coordinate data storage area 21 consists of a regular outline data region 211 and a boldface outline data region 212. The regular outline data region 211 stores a group of coordinate data sets for the regular outline of each character which has a standard stroke width, while the boldface outline data region 212 stores a group of coordinate data sets for the boldface outline of each character which has a larger stroke width than the standard stroke width. The regular and boldface outlines of character "D" are illustrated in FIGS. 3A and 3B, respectively, by way of example. The group of coordinate data sets for the regular outline of character "D" is indicated at 32 in FIG. 4A, while the group of coordinate data sets for the boldface outline of the same character is indicated at 33 in FIG. 4A.

Each group of attribute flags stored in the attribute flag storage area 22 of the CHARACTER ROM 3 is used commonly for the two groups of coordinate data sets (32, 33) of the corresponding character. The group of attribute flags corresponding to the two groups of coordinate data sets 32, 33 is indicated at 31 in FIG. 4B.

Referring to FIGS. 3A, 3B, and FIGS. 4A, 4B, the attribute flags in relation to the coordinate points of the regular and boldface outlines of character "D" will be explained. The outer loop of the regular outline of FIG. 3A has: start point A(xr0, yr0) indicated by the start point flag "S"; first and second control points B(xr1, yr1) and C(xr2, yr2) of a counterclockwise Bezier curve indicated by the Bezier curve flag "B"; and end point D(xr3, yr3) of this Bezier curve; end point A(xr0, yr0) of a straight line indicated by the straight line flag "L". The inner loop of the regular outline has: start point E(xr4, yr4) indicated by the flag "S"; end point F(xr5, yr5) of a straight line indicated by the flag "L"; first and second control points G(xr6, yr6) and H(xr7, yr7) of a clockwise Bezier curve indicated by the flag "B"; end point E(xr4, yr4) of this Bezier curve.

Similarly, the outer loop of the boldface outline of FIG. 3B has: start point I(xb0, yb0) indicated by the start point flag "S"; first and second control points J(xb1, yb1) and K(xb2, yb2) of a counterclockwise Bezier curve indicated by the Bezier curve flag "B"; and end point L(xb3, yb3) of this Bezier curve; end point I(xb0, yb0) of a straight line indicated by the straight line flag "L". The inner loop of the boldface outline has: start point M(xb4, yb4) indicated by the flag "S"; end point N(xb5, yb5) of a straight line indicated by the flag "L"; first and second control points O(xb6, yb6) and P(xb7, yb7) of a clockwise Bezier curve indicated by the flag "B"; end point M(xb4, yb4) of this Bezier curve.

Figure 5:
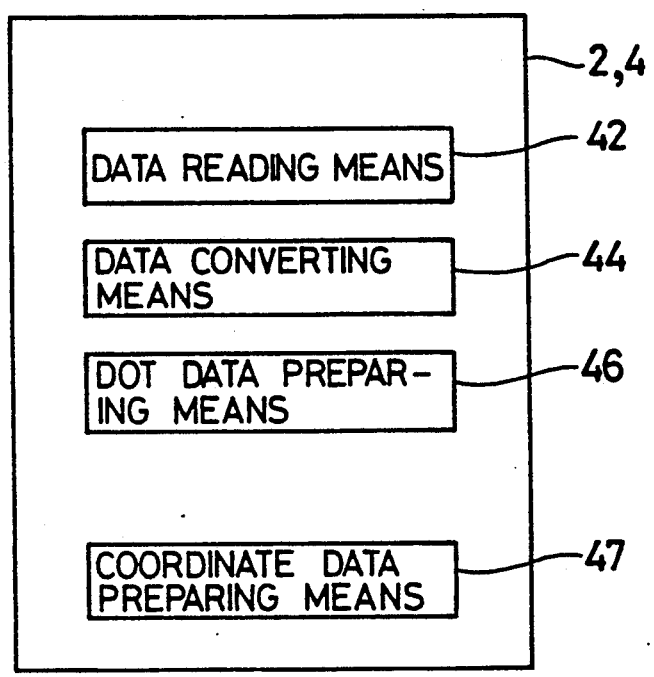
FIG. 5 is a view showing functional portions of a microcomputer of the control device.
Figure 6:
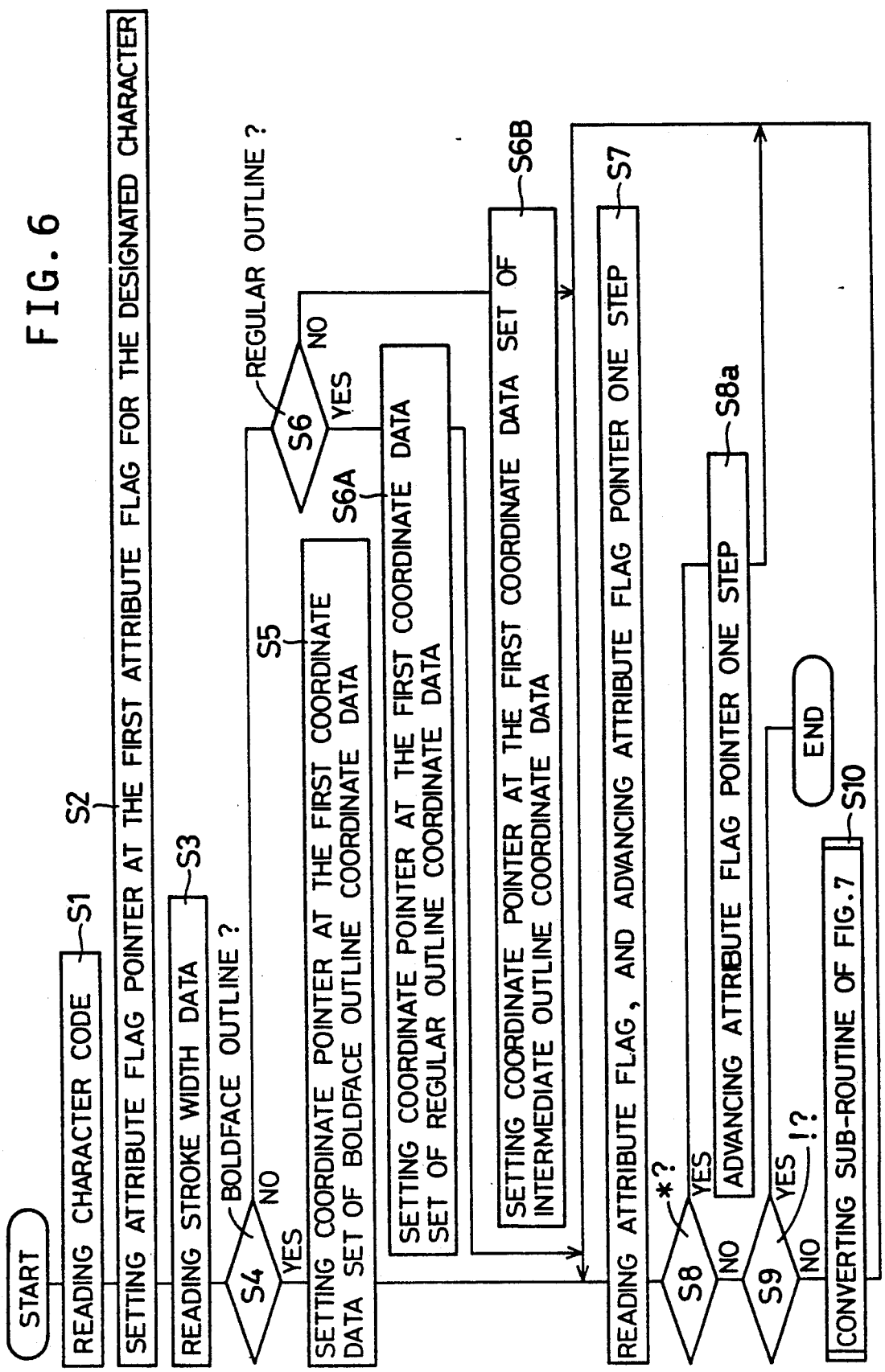
FIG. 6 is a flow chart illustrating a data converting operation performed by data converting means of the control device.

The PROGRAM ROM 4 stores the control programs for performing the data converting routine illustrated in the flow chart of FIG. 6..As indicated in FIG. 5, the CPU 2 and the PROGRAM ROM 4 cooperate with each other to provide the following functional means: data reading means 42; data converting means 44; dot data preparing means 46 (indicated above); and coordinate data preparing means 47.

The data reading means 42 functions to read out from the TEXT memory 6 through the bus 8, various data such as data necessary for the data converting means 44 to perform the data converting routine of FIG. 6, data necessary for the dot data preparing means 46 to perform an operation for preparing dot data, and data necessary for the coordinate data preparing means 47 to perform an operation for preparing coordinate data which will be described by reference to FIGS. 8 and 9.

More specifically, the data converting means 44 functions to read out from the attribute flag storage area 22 the attribute flags one after another, depending upon the character code read by the reading means 42. Further, the data converting means 44 reads out the coordinate data sets from the regular outline data region 211 or boldface outline data region 212 of the coordinate data storage area 21, depending upon the character code and the stroke width data read by the reading means 42, as the corresponding attribute flags are read out. In the example of FIGS. 4A and 4B, the attribute flags 31 are read out one after another, while the coordinate data sets 32 or coordinate data sets 33 are read out according to the flags 31, depending upon the stroke width data received from the input device 9 by the data reading means 42. The outline data thus read is processed as described below by reference to FIGS. 6 and 7. The processed outline data is stored in a buffer of the WORKING memory 6.

When any special or intermediate stroke width intermediate between the standard stroke widths of the regular and boldface outlines is received from the input device 9, the coordinate data preparing means 47 operates to calculate a group of coordinate data sets, from the groups of coordinate data sets for the regular and boldface outlines stored in the CHARACTER ROM 3.

The dot data preparing means 46 functions to preparing dot data by conversion of the outline data processed by the data converting means 44. The operation to convert character outline data into dot is well known in the art, as disclosed in U.S. Pat. No. 5,018,217 to Hitoshi Yoshida et. al., and U.S. Pat. No. 5,073,956 to Naoyuki Kawamoto et. al., the disclosures of which are herein incorporated by reference.

Referring to the flow chart of FIG. 6, the operation of the data converting means 44 will be described. Before the operation of this data converting means 44, the necessary printing data such as character codes and stroke width data have been received from the input device 9 and stored in the TEXT memory 5.

Initially, step S1 is implemented to read out a character code from the TEXT memory 5. Then, step S2 is executed to set an attribute flag pointer at the first one of the attribute flags for the character designated by the character code. Namely, the attribute flag pointer is set at the start point flag "S" stored in the leading address of a region of the attribute flag storage area 22 in which is stored the group of attribute flags for the designated character.

Step S2 is followed by step S3 in which the stroke width data stored in the TEXT memory 5 is read out. Step S4 is then implemented to determine, based on the stroke width data, whether or not the designated character is required to be printed in boldface, that is, whether or not the outline data for the boldface outline of the designated character is required. If an affirmative decision (YES) is obtained in step S4, step S5 is implemented to set a coordinate pointer at the first one of the coordinate data sets stored in the boldface outline data region 212 of the coordinate data storage area 21 of the CHARACTER ROM 3. In the example of FIG. 4A, the coordinate pointer is set at the first coordinate data set (xbo, ybo) for the boldface outline of the character "D".

If a negative decision (NO) is obtained in step S4, the control flow goes to step S6 to determine, based on the stroke width data, whether or not the outline data for the regular outline of the designated character is required. If an affirmative decision (YES) is obtained in step S6, step S6A is implemented to set the coordinate pointer at the first coordinate data set stored in the regular outline data region 211 of the coordinate data storage area 21. In the example of FIG. 4A, the coordinate pointer is set at the first coordinate data set (xro, yro) for the regular outline of the character "D".

If a negative decision (NO) is obtained in step S6, this means that the outline data for a special or intermediate outline whose stroke width is intermediate between the regular and boldface stroke widths is required. In this case, step S6 is followed by step S6B in which the coordinate pointer is set at the first one of a group of special coordinate data sets for the special outline designated by the stroke width data read in step S3.

Steps S5, S6A and S6B are followed by step S7 in which the first attribute flag "S" designated by the attribute flag pointer is read out from the attribute flag storage region 22, and is stored in the WORKING memory 6. Further, the attribute flag pointer is advanced one step to designate the next attribute flag "B". Step S7 is followed by step S8 to determine whether the read flag is the loop end flag "*" or not. In the first control cycle of the routine of FIG. 6 in which the start point flag "S" is read in step S7, a negative decision (NO) is obtained in step S8, and the control flow goes to step S9 to determine whether the flag is the outline end flag "!" or not. In the first control cycle, a negative decision (NO) is also obtained in this step S9, and step S10 is implemented to perform a data converting sub-routine which is illustrated in detail in the flow chart of FIG. 7. Step S10 is followed by step S7 to read the next attribute flag.

If the attribute flag read in step S7 is the loop end flag "*", step S8 is followed by step S8a in which the attribute flag pointer is advanced one step to designate the first attribute flag for the next closed loop of the character outline, and the control flow goes back to step S7. Steps S7-S10 are repeatedly executed until an affirmative decision (YES) is obtained in step S9, i.e., until the outline end flag "" is read. If the affirmative decision is obtained in step S9, the routine of FIG. 6 is terminated.

Referring next to the flow chart of FIG. 7, the data converting sub-routine in step S10 will be described in detail.

Initially, step S62 is implemented to determine whether the attribute flag read in step S7 is the start point flag "S" or not. If the start point flag "S" was read in step S7, then step S63 is executed to read the coordinate data set (a pair of x-axis and y-axis coordinate values) of the start point of a closed loop of the character outline (e.g., outer loop of the character "D" of FIG. 4A or 4B), which is currently designated by the coordinate pointer. In this step S63, the coordinate pointer is advanced one step to designate the following coordinate data set. Step S63 is followed by step S64 in which the coordinate data set of the start point is processed for required conversions, such as conversion according to the selected size of the character represented by character size data, and conversion according to the selected attitude (e.g., standard upright attitude, and inclined or italic attitude) of the character represented by the character attitude data. The character size data and character attitude data are received from the input device 9 and stored in the TEXT memory 5, as part of the printing data. In the next step S65, the processed coordinate data set is stored in a coordinate data buffer of the WORKING memory 6.

It will be understood that the first data storage area in the form of the coordinate data storage area 21 of the CHARACTER ROM 3, the second data storage area in the form of the attribute flag storage area 22 of the ROM 3, and the third data storage area in the form of the coordinate data buffer of the WORKING memory 6 cooperate to constitute outline data memory means for storing outline data representative of different outlines of the characters available for printing.

If a negative decision (NO) is obtained in step S62, the control flow goes to step S66 to determine whether the attribute flag read in step S7 is the Bezier curve flag "B". If the Bezier curve flag "B" was read in step S7, then step S67 is executed to read the three coordinate data sets (three pairs of x-axis and y-axis coordinate values) for the Bezier curve. Since the coordinate pointer was advanced one step in step S63, the coordinate pointer designates the first one of the three coordinate data sets when step S67 is initiated. Therefore, the first coordinate data set (representative of the first control point) for the Bezier curve is initially read in step S67. Then, the two more coordinate sets (representative of the second control point and end point of the Bezier curve) are read in step S67 by advancing the coordinate pointer two more steps. Finally, the coordinate pointer is further advanced one more step to designate the next coordinate data set. Thus, the coordinate pointer is advanced a total of three steps in step S67, according to the determination of the Bezier curve flag "B" in step S66. Step S67 is followed by step S68 in which the coordinate data sets for the Bezier curve are processed for required conversions as described above with respect to step S64. In the next step S69, the processed coordinate data sets for the Bezier curve are converted into short-vector data, which represent coordinate values defining a plurality of short vectors that approximate the Bezier curve in question. Step S69 is followed by step S65 in which the short-vector data is stored in the coordinate data buffer of the WORKING memory 6.

If a negative decision (NO) is obtained in step S66, the control flow goes to step S70 to determine whether the attribute flag read in step S7 is the straight line flag "L". If the flag "L" was read in step S7, then step S71 is executed to read the coordinate data set (one pair of x-axis and y-axis coordinate values) representative of the end point of the straight line. Since the coordinate pointer was advanced three steps in step S67, the coordinate pointer designates the coordinate data set of the end point of the straight line when step S71 is initiated. Therefore, the coordinate data set in question is read in step S71. The coordinate pointer is then advanced one step to designate the next coordinate data set. In the next step S72, the coordinate data set of the end point of the straight line is processed for required conversions as described above with respect to step S64. Step S69 is followed by step S72 in which the short-vector data is stored in the coordinate data buffer of the WORKING memory 6.

Figure 7:
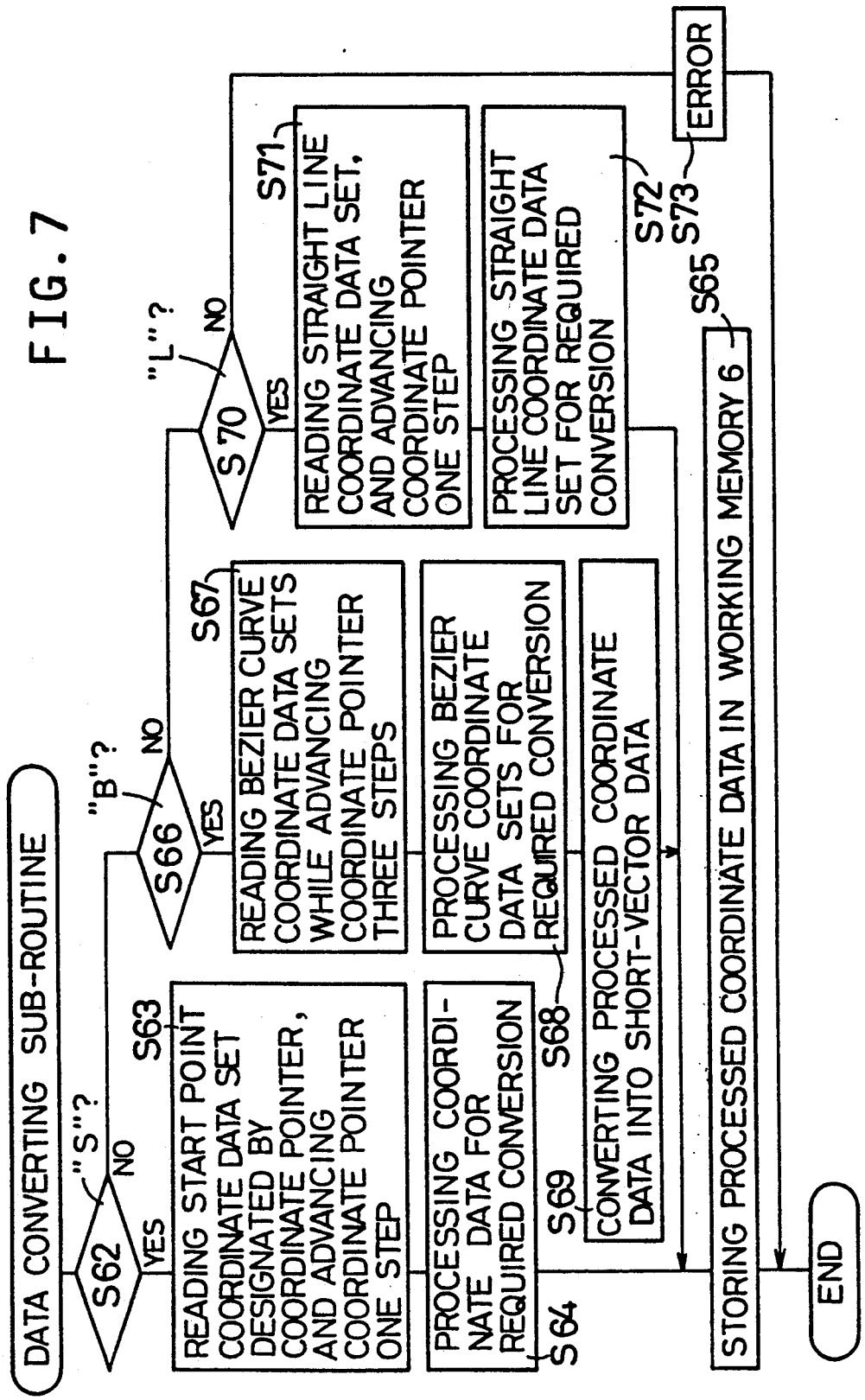
FIG. 7 is a flow chart illustrating a data converting sub-routine performed in step S10 of the flow chart of FIG. 6.

If a negative decision (NO) is obtained in step s70, an error is constituted in step S73, and the sub-routine of FIG. 7 is terminated. In this case, a suitable alarm may be provided.

With the data converting routine of FIG. 6 including the sub-routine of FIG. 7 repeatedly executed until the outline end flag "! is read, the group of outline data for a given outline (regular, boldface or intermediate outline) of the designated character is processed for required conversions including the conversion to the short-vector data as effected in step S69. The thus obtained processed outline data is temporarily stored in the WORKING memory 6.

When a printing is effected by the laser-printing device 10, the processed outline data stored in the WORKING memory 6 is further processed by the dot data preparing means 46, namely, converted into the dot data which represents image dots which collectively define the designated outline of the character. The prepared dot data is stored in the DOT DATA memory 7, from which the dot data is supplied to the laser-printing device 10, so that the image dots are formed according to the dot data, so as to form the designated character outline, in the selected size and attitude.

Figure 8:
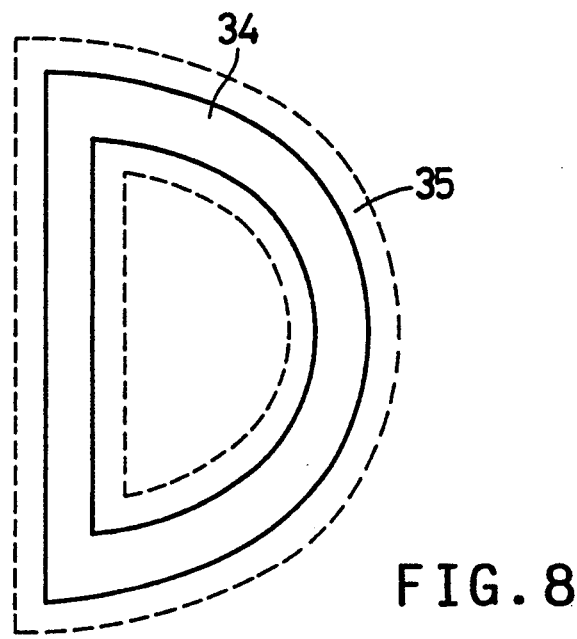
FIG. 8 is an illustration of regular and boldface outlines of character "D" which are superposed on each other.
Figure 9:
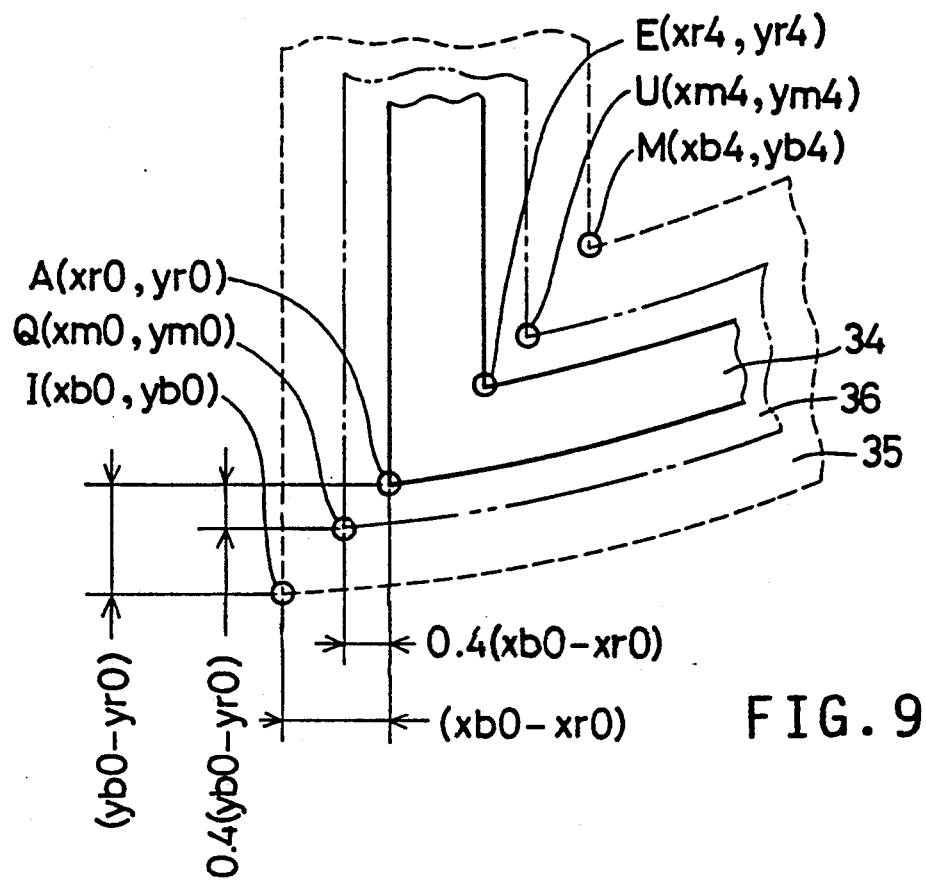
FIG. 9 is a fragmentary enlarged view illustrating parts of the regular and boldface outlines of FIG. 8, and the corresponding part of an intermediate outline calculated from the regular and boldface outlines.

Referring next to FIGS. 8 and 9, there will be described the operation of the coordinate data preparing means 47 which is constituted by the CPU 2 and the PROGRAM ROM 4. As described above, the coordinate data preparing means 47 operates to prepare a group of special coordinate data sets for an intermediate outline whose stroke width is intermediate between the regular and boldface stroke widths.

In FIG. 8, the regular and boldface outlines of character "D" are illustrated such that the regular outline 34 indicated in solid line is disposed within the boldface outline 35 indicated in dashed line, with the center of the stroke width of the outline 34 aligned with that of the stroke width of the outline 35. An intermediate outline 36 whose stroke width is intermediate between the widths of the regular and boldface outlines 34, 35 is indicated in two-dot chain line in the fragmentary enlarged view of FIG. 9. When this intermediate outline 36 is prepared, the coordinate data preparing means 47 calculates the x-axis and y-axis coordinate values of each point defining the intermediate outline 36, according to the following equations (1) and (2):

$$Xmi = xri + 0.01K(xbi - xri) \quad (1)$$

$$ymi = yri + 0.01K(ybi - yri) \quad (2)$$

where,
xri, yri: coordinate values of the regular outline,
xbi, ybi: coordinate values of the boldface outline,
xmi, ymi: coordinate values of the intermediate outline,
K: Stroke width coefficient.

The stroke width coefficient K is equal to "0" for the regular outline 34, and equal to "100" for the boldface outline 35. That is, the coefficient K represents a percent of a difference between the widths of the boldface and regular outlines 35, 34, which difference is added to the width of the regular outline 34, to obtain the width of the intermediate outline 36. The stroke width coefficient K therefore determines the width of the intermediate outline 34, and is larger than "0" and smaller than "100".

For example, when the width of the intermediate outline 36 is equal to the sum of the width of the regular outline 34, and 40% of the difference between the widths of the regular and boldface outlines 34, 35, the x-axis and y-axis coordinate values xmo and ymo of a point Q of the intermediate outline 36 are calculated according to the following equations (3) and (4):

$$xmo = xro + 0.01 \times 40 \times (xbo - xro) \quad (3)$$

$$ymo = yro + 0.01 \times 40 \times (xbo - yro) \quad (4)$$

Details of the manner of preparing such intermediate outline are disclosed in Japanese Patent Publication No. 63-6874 (published on Feb. 12, 1988).

While the present invention has been described in detail in its presently preferred form with a certain degree of particularity, it is to be understood that the invention is not limited to the details of the illustrated embodiment, but may be embodied with various changes, modifications and improvements, which may occur to those skilled in the art, without departing from the spirit and scope of the invention defined in the appended claims.

For instance, the CHARACTER ROM 3 may be adapted to store groups of coordinate data sets for any other standard outlines of each character, in addition to those for the regular and boldface outlines.

While the CHARACTER ROM 3 has the coordinate data storage area 21 and the attribute flag storage area 22, the coordinate data and the attribute flags are stored in respective read-only memories.

The illustrated embodiment takes the form of the data processing apparatus incorporated in the control device for the laser printer, the principle of the present invention is equally applicable to a data processing apparatus for other types of printer, and to any other output devices such as a display device, which are capable of outputting characters according to character codes received from suitable input means such as a keyboard and an external device (e.g., host computer).

What is claimed is:

1. A data processing apparatus for processing a batch of outline data representative of outlines of a plurality of characters each consisting of at least one stroke, each of said outlines consisting of a plurality of segments which consist of at least one straight line and/or at least one curved line, said apparatus including outline data memory means for storing said batch of outline data, each of said segments being represented by coordinate data sets representative of coordinate values which define each said segment, and attribute flags indicative of whether each said segment is a straight line or a curved line, wherein the improvement comprises:

said outline data memory means including a first storage area storing a plurality of groups of coordinate data sets for respective different outlines of each character which define respective different stroke widths of said each character, and a second storage area storing a common group of attribute flags common to said plurality of groups of coordinate data sets.

2. A data processing apparatus according to claim 1, further including:

character designating means for designating one of said plurality of characters;

stroke width designating means for designating one of said different stroke widths of the character designated by said character designating means; and first data converting means for reading from said first storage area of said outline data memory means one of said groups of coordinate data sets for the character designated by said character designating means, which one group of coordinate data sets is designated by said stroke width designating means, said first data converting means further reading from said second data storage area said common group of attribute flags for said character designated by said character designating means, said first data converting means converting said one group of coordinate data sets into dot data representative of image dots which collectively define the character outline designated by said character designating means and said stroke width designating means.

3. A data processing apparatus according to claim 2, wherein said first data converting means comprises:

second reading means for reading one after another from said second data storage area of said outline data memory means attribute flags of said common group of attribute flags for the character designated by said character designating means; and first reading means for reading from said first data storage area of said outline data memory means one or a plurality of coordinate data sets of said one group of coordinate data sets designated by said character designating means and said stroke width designating means, when each of said attribute flags of said common group of attribute flags is read by said flag reading means, the number of said coordinate data sets to be read being determined by said each attribute flag read by said flag reading means.

4. A data processing apparatus according to claim 3, wherein said second reading means comprises:
an attribute flag pointer for specifying an address in said second data storage area at which the attribute flag to be read next is stored;
flag reading means for reading the attribute flag from the address specified by said attribute flag pointer; and
attribute flag pointer control means, operable when one of said plurality of characters is designated by said character designating means, for causing said attribute flag pointer to specify a leading address of a region of said second data storage area in which is stored said common group of attribute flags for the character designated by said character designating means, said attribute flag pointer control means advancing said attribute flag pointer one step to specify the following address of said region, each time the attribute flag is read.

5. A data processing apparatus according to claim 3, wherein said first reading means comprises:
a coordinate pointer for specifying an address in said first data storage area at which the coordinate data set to be read next is stored;
coordinate reading means for reading the coordinate data sets from the address specified by said coordinate pointer; and
coordinate pointer control means, operable when one of said plurality of groups of coordinate data sets is designated by said character designating means and said stroke width designating means, for causing said coordinate pointer to specify a leading address of a region of said first data storage area in which is stored said one group of coordinate data sets, said coordinate pointer control means advancing said coordinate pointer at least one step to specify the following addresses of said region, the number of said at least one step being determined by each said attribute flag read by said second reading means.

6. A data processing apparatus according to claim 2, wherein said first data converting means comprises:
an attribute flag pointer for specifying an address in said second data storage area at which is stored an attribute flag to be read next of said common attribute flag data set of the character designated by said character designating means;
flag reading means for reading the attribute flag from the address specified by said attribute flag pointer;
attribute flag pointer control means, operable when one of said plurality of characters is designated by said character designating means, for causing said attribute flag pointer to specify a leading address of a region of said second data storage area in which is stored said common group of attribute flags for the character designated by said character designating means, said attribute flag pointer control means advancing said attribute flag pointer one step to specify the following address of said region of said second data storage area, each time the attribute flag is read.
a coordinate pointer for specifying an address in said first data storage area at which is stored a coordinate data set to be read next of said one group of coordinate data sets designated by said character designating means and said stroke width designating means;
coordinate reading means for reading the coordinate data sets from the address specified by said coordinate pointer, the number of said coordinate data sets to be read being determined by said each attribute flag read by said flag reading means; and
coordinate pointer control means, operable when one of said plurality of groups of coordinate data sets is designated by said character designating means and said stroke width designating means, for causing said coordinate pointer to specify a leading address of a region of said first data storage area in which is stored said one group of coordinate data sets, said coordinate pointer control means advancing said coordinate pointer at least one step to specify the following addresses of said region of said first data storage area, the number of said at least one step being determined by each said attribute flag read by said flag reading means.

7. A data processing apparatus according to claim 2, further including second data converting means for converting at least a part of said one group of coordinate data sets read from said first storage area of said outline data memory means, into short-vector data, before said one group of coordinate data sets is converted into said dot data.

8. A printer including a data processing apparatus as defined in claim 7, and a printing device for effecting recording on a recording medium, according to said dot data.

9. A printer according to claim 8, further comprising input means for inputting character codes representative of said plurality of characters, respectively, said input means serving as said character designating means.

10. A data processing apparatus for processing a batch of outline data representative of outlines of a plurality of characters each consisting of at least one stroke, each of said outlines consisting of a plurality of segments which consist of at least one straight line and/or at least one curved line, each of said segments being represented by coordinate data sets representative of coordinate values which define each said segment, and attribute flags indicative of whether each said segment is a straight line or a curved line, said apparatus comprising:
outline data memory means storing said batch of outline data, said outline data memory means including a first storage area storing a plurality of groups of standard coordinate data sets for respective standard outlines of each character which define respective different standard stroke widths, and a second storage area storing a common group of attribute flags common to said plurality of groups of coordinate data sets;
special stroke width designating means for designating a desired stroke width of each character; and
coordinate data preparing means for obtaining, from said plurality of groups of standard coordinate data sets, a group of special coordinate data sets representative of an outline of said each character having said desired stroke width designated by said special stroke width designating means, and
said outline data memory means further including a third data storage area for storing said group of special coordinate data sets, in relation to said common group of attribute flags stored in said second data storage area.

11. A data processing apparatus according to claim 10, wherein said respective standard outlines of each character consist of a regular outline defining a regular stroke width, and a boldface outline defining a boldface stroke width larger than said regular stroke width, said special stroke width designating means designating an intermediate stroke width between said regular stroke width and said boldface stroke width, said coordinate data preparing means obtaining said group of special coordinate data sets representative of a character outline defining said intermediate stroke width, based on the coordinate data sets representative of said regular outline and said boldface outline.

12. A data processing apparatus according to claim 10, further comprising:
character designating means for designating one of said plurality of characters;
standard stroke width designating means for designating one of said different standard stroke widths of the character designated by said character designating means; and
data converting means, operable when one of said different standard stroke widths is designated by said standard stroke width designating means, for reading from said first data storage area of said outline data memory means one of said plurality of groups of standard coordinate data sets of the character which is designated by said character designating means, which one standard coordinate data set is designated by said standard stroke width designating means, and from said second data storage area said common group of attribute flags of said character designated by said character designating means, said data converting means being further operable, when said desired stroke width is designated by said special stroke width designating means, for reading from said third data storage area said group of special coordinate data sets designated by said character designating means and said special width designating means, and from said second data storage area said common attribute flag data set designated by said character designating means, said data converting means converting said one group of standard coordinate data sets and said group of special coordinate data sets into dot data.

* * * * *